United States Patent [19]
Portch et al.

[11] Patent Number: 5,884,020
[45] Date of Patent: Mar. 16, 1999

[54] METHOD FOR MODIFYING THE SOFTWARE PROCEDURES OF A COMMUNICATIONS SYSTEM

[75] Inventors: Geoffrey Portch; Juergen Peifer; Carsten Leidreiter, all of Munich; Joerge Hollwedel, Neuried; Birgitta Wokittel, Munich; Margrit Grzegorek, Munich, all of Germany

[73] Assignee: Siemens Aktiengesellschaft, Munich, Germany

[21] Appl. No.: 681,392

[22] Filed: Jul. 23, 1996

[30] Foreign Application Priority Data

Jul. 28, 1995 [DE] Germany .......................... 19527808.9

[51] Int. Cl.⁶ .................................................... G06F 11/30
[52] U.S. Cl. ....................................................... 395/182.07
[58] Field of Search .................... 395/182.07, 200.52, 395/500, 673, 653, 712

[56] References Cited

U.S. PATENT DOCUMENTS

| | | |
|---|---|---|
| 4,204,253 | 5/1980 | van den Haneberg et al. . |
| 5,321,844 | 6/1994 | Schwagmann ..................... 395/182.07 |
| 5,371,492 | 12/1994 | Lohrbach et al. ................. 340/825.03 |
| 5,450,567 | 9/1995 | Mori et al. ............................... 395/500 |
| 5,463,735 | 10/1995 | Pascucci et al. ................... 395/200.52 |
| 5,506,988 | 4/1996 | Weber et al. ........................... 395/673 |

FOREIGN PATENT DOCUMENTS

| | | |
|---|---|---|
| 0 492 251 A2 | 1/1992 | European Pat. Off. . |
| 0 492 251 A 2 | 7/1992 | European Pat. Off. . |
| 39 37 532 A1 | 5/1990 | Germany . |
| WO 94/00813 | 6/1994 | WIPO . |

OTHER PUBLICATIONS

Cir: Covvemanns Sigplan Notices May 1984 vol. 19, No. 5 pp. 113–123.

*Primary Examiner*—James P. Trammell
*Assistant Examiner*—Matthew Smithers
*Attorney, Agent, or Firm*—Hill & Simpson

[57] ABSTRACT

Method for the modification of the software procedures of a communications system. In modern communications systems, errors arising in the software procedures must be rapidly removed. The method effects this through the efficient insertion of required modifications, under the control of a higher-order control program.

18 Claims, 3 Drawing Sheets

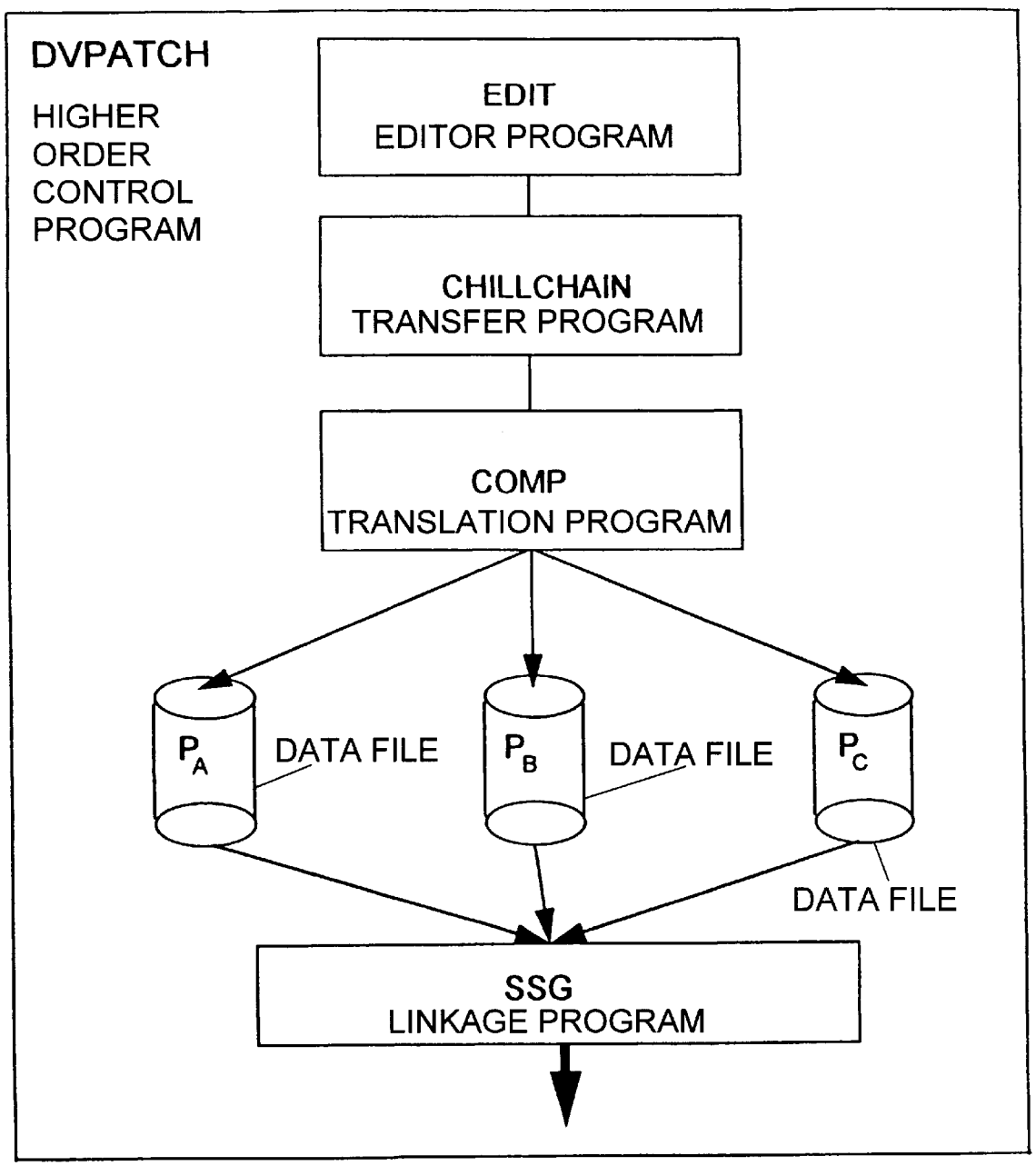

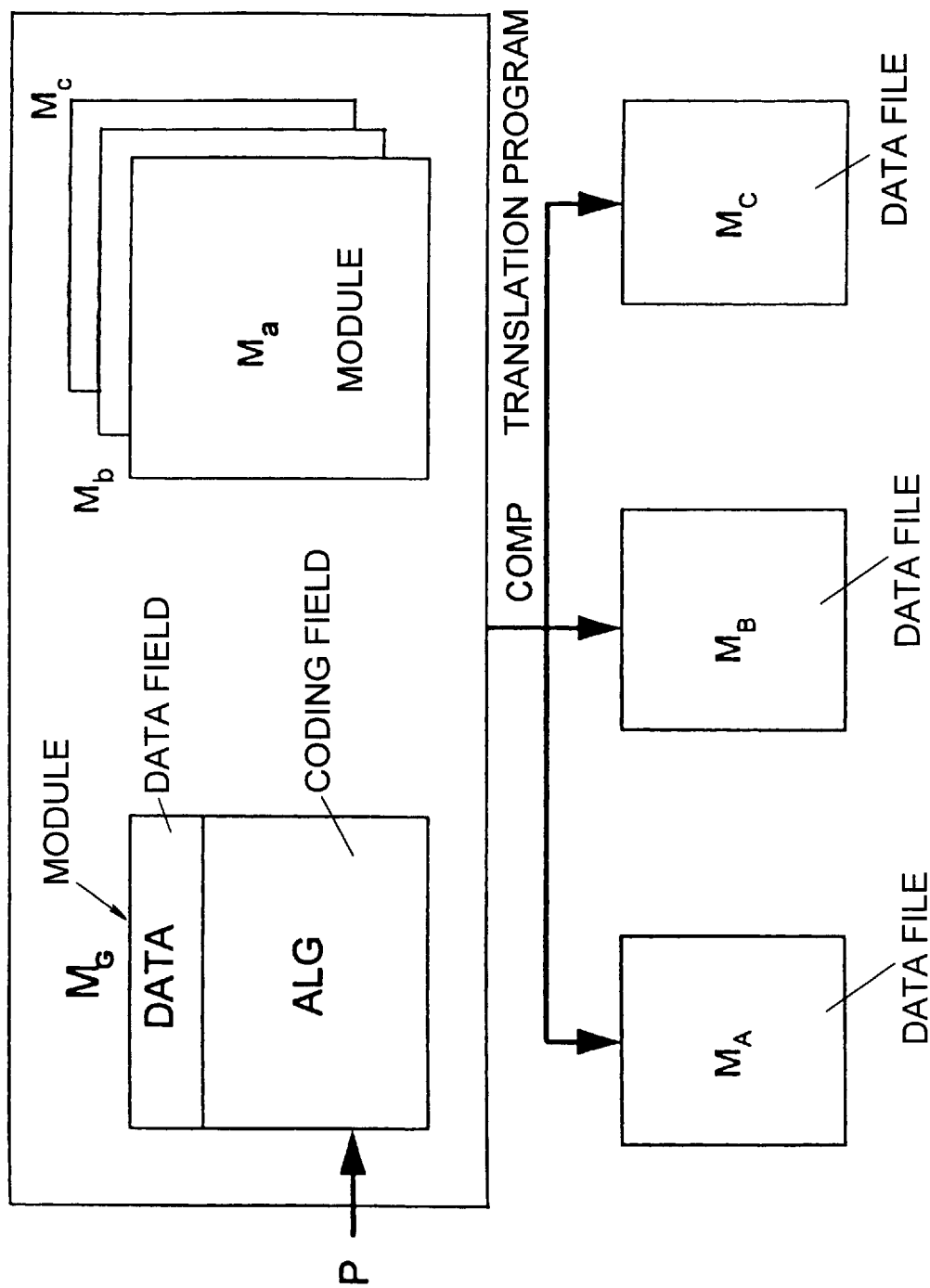

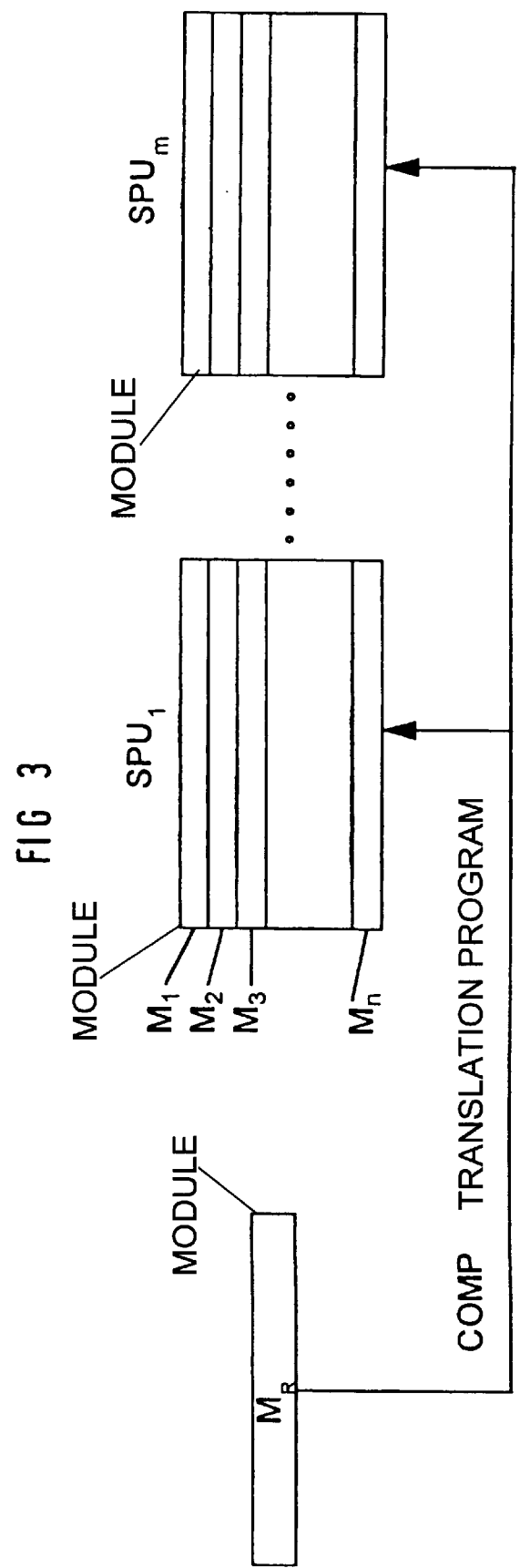

METHOD FOR MODIFYING THE SOFTWARE PROCEDURES OF A COMMUNICATIONS SYSTEM

BACKGROUND OF THE INVENTION

The present invention relates to a method for the insertion of modifications into software procedures in communication systems.

In modern communications systems, besides a higher processing speed, there is a demand for availability to all subscribers at all times. This has the consequence that, for example, a communications system cannot be shut down for removal of software errors, as is the case for other data processing equipment. For this reason, methods have been developed that enable a rapid installation at short notice of small modifications in the software procedures of the communications system. With these patches, as they are known, small software modifications can be rapidly and efficiently brought about.

For simpler logical coding errors, the faulty code is thereby simply overwritten. However, if additional code must also be added during the execution of the program, the installed patch is connected with what is called a "knapsack." This contains the additional programming code required for the removal of the logical error. The correction of the modified programming code occurs during subsequent execution in that the procedure branches to the installed knapsack at the corresponding modification point, and after execution of the same, a jump back to the original programming code takes place. This process is controlled via an allocated patch management that is implemented as a data library. The addresses of the knapsacks allocated to the patches are stored therein in table form.

European patent application EP 0 492 251 describes a method for the installation at short notice of error corrections in the software procedures of a communications system. It is disclosed therein how a patch is installed by high-priority patch processes, with exclusive reservation of the relevant processors. However, it is not disclosed or taught how patches are installed in software structures having generic modules or having reusable modules.

SUMMARY OF THE INVENTION

It is an object of the present invention to provide a method by which modern software structures can also be patched.

In general terms the present invention is a method for insertion of modifications into software procedures of communications systems having patches coded in a higher programming language, and having at least one translation program that translates source modules, in a plurality of translation runs if necessary, and stores the results in data files, distinct from one another if necessary. Under the control of a higher-order control program, the insertions of the modifications are carried out in a first program, by inserting at least one of the patches in the source module in question. A second program supplies relevant information for the translation process. At least one translation program carries out the translation of this source module according to the standard of a criterion. The patches produced in this way are stored in a determined format in the data files, which are distinct from one another if necessary. A linkage program combines and physically prepares the patches stored in these data files.

The installation of the patches in only one source module in a higher programming language is important in the present invention. After the editing process, which ensues in a first program, a further program is called, which supplies information about the translation process. Subsequently, the actual translation process is started by a translation program. As a rule, several translation runs must be carried out, whereby the number of translation runs depends for example on the number of data modules. The patches are then stored in data files and connected together again into a patch via a linkage program. A transposition into online code subsequently ensues. This is then installed in the relevant software procedures. These processes are controlled by a higher-level control program.

Advantageous developments of the present invention are as follows.

It is provided that the source module is a generic module having a coded algorithm and at least one data field, and, together with a plurality of data modules, serves as input quantity of the at least one translation program. This has the advantage that code modifications can be installed in the software structures that comprise generic modules.

It is provided that a higher-level structure is defined by a plurality of modules and the source module has the characteristic of being equally present in several of these higher-level structures. This has the advantage that code modifications can be installed in software structures that comprise reusable modules.

It is provided that at least one criterion is defined by the number of the data modules. As many translation processes are thereby automatically started as there are data modules present.

It is provided that at least one criterion is defined by the number of the higher-level structures in which the source module is equally present. As many translation processes are thereby automatically started as there are structures present having the above-named characteristics.

It is provided that the determined format is formed from the patches stored in ASCII format, as well as command orders for the physical installation of the patches in the procedures of the communications system.

It is provided that the first program is an editor program. This has the advantage that the patches can be added in a higher programming language.

It is provided that the information supplied by the second program is information concerning cross-relations of the modules, concerning the version numbers of the software of the communications system, and concerning in which of the source modules the patches were installed. This has the advantage that this information is automatically available before the translation process.

It is provided that the patches are managed in a library, and, upon the addition of a patch, the library concerned is updated with the data relevant thereto. This has the advantage that a copy of the patches present in the communications software is stored at all times.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts the inventive method;

FIG. 2 depicts generic modules, as they are used in the communications system; and FIG. 3 depicts reusable modules, as they are used in communications systems.

DESCRIPTION OF THE PREFERRED EMBODIMENTS

FIG. 2 discloses generic modules $M_G$. They have a data field DATA and a coding field ALG, in which the actual algorithm is coded. Data modules $M_a$, $M_b$ and $M_c$ are also provided, in which the data type is defined. It is characteristic for this software that the algorithm and data are organizationally managed separately. In the exemplary embodiment, it should be assumed that in the data module $M_a$ data of the data type INTEGER are managed. It is further assumed that in the data module $M_b$ data of the data type BOOLEAN are managed, and in the data module $M_c$ more complex structures, such as data of the data type ARRAY, are managed.

The generic module $M_G$, as well as the data modules $M_a$, $M_b$, $M_c$, are now supplied to a translation program COMP. For this purpose, in a first translation run the generic module $M_G$ is first loaded together with the data module $M_a$, is translated, and a data file $M_A$ is generated, in which the result of the translation is stored. Subsequently, for a second translation run, the generic module $M_G$ is then loaded together with the data module $M_b$, is translated, and the result of the translation is stored in a data file $M_B$. The generic module $M_G$ and the data module $M_c$ are handled in the same way, and the translation result is stored in a data file $M_C$. Thus, a total of three translation runs are to be carried out by the translation program COMP, whereby however before the translation process only one algorithm program ALG is provided for the three different data modules.

According to FIG. 3, a further software structure is disclosed, as used in communications systems. Higher-order structures $SPU_1 \ldots SPU_m$ are there provided, which represent only a combination of a plurality of modules $M_1 \ldots M_n$. In practice, the plurality of these structures $SPU_1 \ldots SPU_m$ have the same module $M_R$. Modules of this type are also called reusable modules. For this reason, the module $M_R$ is inserted into the higher-order structures $SPU_1 \ldots SPU_m$ in several translation runs. Several translation runs are thus also necessary here. The module $M_R$ is coded only once and is thus also present only once before the translation process.

FIG. 1 shows the inventive method. It is thereby assumed that the two software structures just described according to FIGS. 2 and 3 are to be modified in their coding sequence.

If a generic module $M_G$ is to be modified, a higher-order control program DVPATCH is first called. This controls the overall sequence of operations of the installation of new code, up to the storing of the generated patch. An editor program EDIT is subsequently activated under the control of the higher-order control program DVPATCH, and the module $M_G$ to be modified is loaded into this editor program. At this point, the relevant patch P is inserted in the codings of the algorithm. The modifications themselves can thereby be carried out in a higher programming language. For a communications system, this is for example the programming language CHILL. If this process is concluded, a further program CHILLCHAIN is started. This program must in particular see to it that relevant information for the translation process is given over to the translation program COMP. Thus, here at first information concerning cross-relations (GRANT, SEIZE), as well as the version number of the relevant system software, must be determined. Moreover, it must be determined which module $M_G$ has been modified. This information is given to the translation program COMP.

Under the control of the higher-order control program DVPATCH, the translation program COMP is now started. As input quantities, at first the generic module $M_G$ with the first data module $M_a$ are valid. Both modules are thereby completely loaded. As translation result, only the installed patches P are then translated and stored in the data file $P_A$. Here the patch is stored in ASCII format. Command orders for the ONLINE patch tools are subsequently also stored.

In the present exemplary embodiment, it is assumed that a total of 3 data modules are present. The number of translation runs is thereby also predetermined. The number of translation runs is thus dependent on the number of data modules $M_a$, $M_b$, $M_c$. Thus, the translation program COMP is started two more times, whereby as a result two patches are also translated here and are stored in two further data files $P_B$, $P_C$. A linkage program SSG is subsequently started, which again combines the patches P stored in the data files $P_A$, $P_B$, $P_C$ into one data file. The linkage program SSG must also see to it that the patches P are physically prepared. Subsequently, the patch P can now be physically inserted into the procedures of the communications system, using ONLINE PATCH tools, which procedures however are not part of the subject matter of the exemplary embodiment.

The procedure is the same if the codings of a reusable module $M_R$ are to be modified. In this case, only the source module $M_R$ is used as input quantity for the translation program. The number of translation runs is determined by the number of structures $SPU_x$ in which the source module $M_R$ is equally present.

The data of the patches are managed in a library. During the insertion of a patch, the relevant library is updated with the corresponding data. In the present exemplary embodiment, only the installation of error corrections was described. The present invention is however not limited to this. Rather, it is also possible to modify the code of the software procedures in general.

In the present exemplary embodiment, the removal of smaller software errors was addressed. The present invention is however not limited to the rapid and efficient removal of errors of this type. With the present inventive method, it is also possible to modify the codings in general or to expand them with additional code. For example, it is possible to insert a procedure into the software during operation of the communications system using the present inventive method.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for inserting modifications into software procedures of communications systems having patches coded in a higher programming language, and having at least one translation program that translates source modules, in at least one translation run, and that stores results of the translation in data files that are distinct from one another if necessary, comprising the steps of:

carrying out, under control of a higher-order control program, inserting of modifications in a first program, by inserting at least one patch in a predetermined source module;

supplying, via a second program, information for a translation process;

carrying out, via at least one translation program, translation of the predetermined source module according to at least one criterion, to produce at least one patch;

storing at least one patch in a determined format in a data file; and combining and physically preparing, via a linkage program, patches stored in the data file;

wherein patches can be stored in a plurality of data files which if necessary are distinct from one another and wherein the linkage program combines and physically prepares the patches stored in the plurality of data files.

2. The method according to claim 1, wherein the source module is a generic module having a coded algorithm and at least one data field, and, together with a plurality of data modules, serves as input quantity to at least one translation program.

3. The method according to claim 1, wherein higher-order structures are defined by a plurality of modules, and wherein the source module is equally present in at least two of said higher-order structures.

4. The method according to claim 3, wherein at least one criterion is defined by the number of the higher-order structures in which the source module is equally present.

5. The method according to claim 1, wherein at least one criterion is defined by the number of the data modules.

6. The method according to claim 1, wherein the determined format is formed from patches which are stored in ASCII format, as well as from command orders for physical installation of the patches in the software procedures of the communications system.

7. The method according to claim 1, wherein the first program is an editor program.

8. The method according to claim 1, wherein the information supplied by the second program concerns cross-relations of the modules, version numbers of software of the communications system, and identity of source modules in which the patches have been installed.

9. The method according to claim 1, wherein the patches are managed in a library, and wherein, during the insertion of a patch, the library is updated with the data regarding the inserted patch.

10. A method for inserting modifications into software procedures of communications systems having patches coded in a higher programming language, and having at least one translation program that translates source modules, in at least one translation run, and that stores results of the translation in data files that are distinct from one another if necessary, comprising the steps of:

providing a predetermined source module that is a generic module having a coded algorithm and at least one data field;

inserting at least one patch in the predetermined source module for modification of a first program;

supplying, via a second program, information for a translation process;

carrying out, via at least one translation program, translation of the predetermined source module according to at least one criterion, to produce at least one patch;

storing at least one patch in a determined format in a data file;

combining and physically preparing, via a linkage program, patches stored in the data file;

wherein patches can be stored in a plurality of data files which if necessary are distinct from one another and wherein the linkage program combines and physically prepares the patches stored in the plurality of data files; and wherein the source module together with a plurality of data modules, serves as input quantity to the at least one translation program.

11. The method according to claim 10, wherein higher-order structures are defined by a plurality of modules, and wherein the source module is equally present in at least two of said higher-order structures.

12. The method according to claim 11, wherein at least one criterion is defined by the number of the higher-order structures in which the source module is equally present.

13. The method according to claim 10, wherein at least one criterion is defined by the number of the data modules.

14. The method according to claim 10, wherein the determined format is formed from patches which are stored in ASCII format, as well as from command orders for physical installation of the patches in the software procedures of the communications system.

15. The method according to claim 10, wherein the first program is an editor program.

16. The method according to claim 10, wherein the information supplied by the second program concerns cross-relations of the modules, version numbers of software of the communications system, and identity of source modules in which the patches have been installed.

17. The method according to claim 10, wherein the patches are managed in a library, and wherein, during the insertion of a patch, the library is updated with the data regarding the inserted patch.

18. A method for inserting modifications into software procedures of communications systems having patches coded in a higher programming language, and having at least one translation program that translates source modules, in at least one translation run, and that stores results of the translation in data files that are distinct from one another if necessary, comprising the steps of:

providing a predetermined source module that is a generic module having a coded algorithm and at least one data field;

providing higher-order structures defined by a plurality of modules, the predetermined source module being equally present in at least two of said higher-order structures;

inserting at least one patch in the predetermined source module for modification of a first program;

supplying via a second program information that is relevant for a translation process;

carrying out via at least one translation program translation of the predetermined source module according to at least one criterion that is defined by the number of the higher-order structures in which the source module is equally present, to produce at least one patch;

storing at least one patch in ASCII format in a data file;

combining and physically preparing, via a linkage program, patches stored in at least one data file;

wherein patches can be stored in a plurality of data files which if necessary are distinct from one another and wherein the linkage program combines and physically prepares the patches stored in the plurality of data files;

wherein the source module, together with a plurality of data modules, serves as input quantity to at least one translation program.

* * * * *